United States Patent [19]
Kriz et al.

[11] Patent Number: 5,097,402
[45] Date of Patent: Mar. 17, 1992

[54] DUAL MODE POWER SUPPLY

[75] Inventors: J. Stanley Kriz, Fairfax; James Ripp, Blacksburg, both of Va.

[73] Assignee: AVP/Megascan, Littleton, Mass.

[21] Appl. No.: 504,350

[22] Filed: Apr. 4, 1990

[51] Int. Cl.⁵ ............................................. H02M 7/06
[52] U.S. Cl. ...................................... 363/61; 363/143
[58] Field of Search ................... 323/300; 363/61, 143

[56] References Cited

U.S. PATENT DOCUMENTS

| | | |
|---|---|---|
| 3,079,544 | 2/1963 | Osborne et al. |
| 3,900,787 | 8/1975 | Koster ................... 363/61 |
| 3,979,661 | 9/1976 | Matz . |
| 4,011,499 | 3/1977 | Betsill et al. ......................... 336/150 |
| 4,433,368 | 2/1984 | Choi ....................... 363/45 |
| 4,590,546 | 5/1986 | Maile ......................... 363/37 |
| 4,608,500 | 8/1986 | Togawa ............................ 307/72 |
| 4,654,538 | 3/1987 | Lethellier ................ 307/75 |
| 4,658,345 | 4/1987 | Ingman ................... 363/143 |
| 4,665,323 | 5/1987 | Russel et al. ................. 307/75 |
| 4,783,729 | 11/1988 | Konopka ............................ 363/143 |
| 4,805,083 | 2/1989 | Konopka ............................ 363/143 |
| 4,845,607 | 7/1989 | Nakao et al. ........................... 363/49 |
| 4,933,832 | 6/1990 | Schneider et al. ................... 363/143 |

FOREIGN PATENT DOCUMENTS

| | | | |
|---|---|---|---|
| 46675 | 3/1982 | Japan | ................................. 363/143 |
| 122727 | 6/1986 | Japan . | |
| 178173 | 8/1987 | Japan . | |

OTHER PUBLICATIONS

Sass, "Universal Input Adds Flexibility to Switching Supplies," *Elect. Products*, pp. 29-31, Mar. 1990.

*Primary Examiner*—William H. Beha, Jr.
*Attorney, Agent, or Firm*—Stephen G. Matzuk

[57] ABSTRACT

A power supply operable from power mains voltages generally within two voltage ranges according to which the power supply automatically switches between a full wave and a voltage doubler. Furthermore, the power supply provides automatic mode selection on a cycle-by-cycle basis, sensing the mains signal during an initial portion of the mains input cycle and causing the power supply to select a mode of operation during that cycle. Thus, the present invention provides rapid response to changing mains voltages. Moreover, the voltage doubler mode is inhibited during the initial power up period, providing a margin of safety when initially energized or when connected to rapidly changing mains voltages.

4 Claims, 1 Drawing Sheet

DUAL MODE POWER SUPPLY

FIELD OF THE INVENTION

The present invention relates to power supplies operated from power mains, and in particular, to multi-mode power supplies operable from a wide range of mains voltages.

BACKGROUND OF THE INVENTION

It is desireable for power supply equipment to be operable from any mains voltage that is available in any country in the world without mechanical switches, adjustments or other user intervention. Accordingly, the power supplies must work with a voltage range from approximately 85 volts A.C. (Japanese low line) to 265 volts A.C. (European high line) and any voltage in between. Conventional power supply designs which meet these requirement require larger or more expensive components, such as transformers, capacitors and switching transistors to accomodate wide variations in mains voltages than would be required for a narrower operating range. Furthermore, the efficiency of a power supply which accomodates mains voltages over a wide range is lower by comparison to power supplies operable over a narrower operating range. While, the narrower operating range is acceptable when it is possible to switch, reconfigure or adjust the power supply for the specific, narrow mains voltage range, such manual alterations are undesireable because the user can easily missconnect the power supply, with catastrophic results.

One approach to provide power supply operation over a wide input range, particularly where the mains voltages comprise two ranges, of approximately 85-132 volts and 180-265 volts, having an approximate 2:1 voltage ratio, is to provide a power supply having a configutation switchable between a first and a second mode. The first mode provides a rectified D.C. output voltage by full wave rectification of the mains power when in the higher voltage range, while the second mode switches the power supply to a voltage doubler when the mains is in the lower voltage range. Previous techniques have provided power supply mode selection in response to a long term average (several cycles) of the input mains voltage, such as determined by the magnitude of the rectified D.C. output voltage. However, the mode control derived from a long term average typically causes the circuit to initially operate in the voltage doubling mode even for mains input in the higher voltage range, subjecting the input of the power supply to unacceptably high voltages during the start-up period. Undesired voltage doubling can also occur during periods of intermittant connection to the mains, which would cause the long term average to drop to a threshold, causing the power supply to operate in the voltage doubler mode. Similarly, a dip in the magnitude of the mains voltage into the lower range for a few cycles followed by a recovery to the higher voltage range would cause the power supply to improperly voltage double, causing an overshoot in the resulting rectified D.C. to exceed the desired range, possibly damaging subsequent circuit elements. Furthermore, slow responding power supply circuits would respond to, and in certain circumstances, magnify the effect of transients imposed on the power mains such as lightning, or other external radio frequency interferrence (RFI). Such signals, if of appropriate magnitude and duration, would cause the slow responding power supply mode control to cause the power supply to switch mode, thereby exacerbating the transients on the mains.

The long term mains voltage variations as may occur during brown-outs, and which would properly permit the circuit to operate in voltage double mode, must nevertheless cause the power supply to immediately be restored to full wave operation when the brown-out is corrected.

SUMMARY OF THE INVENTION

The power supply according to the present invention provides automatic mode selection, which provides a cycleby-cycle response to the voltage of the input mains to accomodate input voltages over a wide range. The rapidly responding power supply according to the present invention senses the mains input voltage and provides a determination of mode at the last possible moment, i.e. immediately before rectification of that cycle or half cycle. Thus, the power supply according to the present invention can properly accomodate very short durations of low mains voltage, and immediately accomodate a recovery in input mains voltage level from a brown-out without lingering in the voltage doubler mode when the input mains has risen to the higher range.

BRIEF DESCRIPTION OF THE DRAWING

These and further features of the present invention will be better understood by reading the following detailed discription, taken together with the Drawing, wherein.

DETAILED DESCRIPTION OF THE INVENTION

Figure 1:
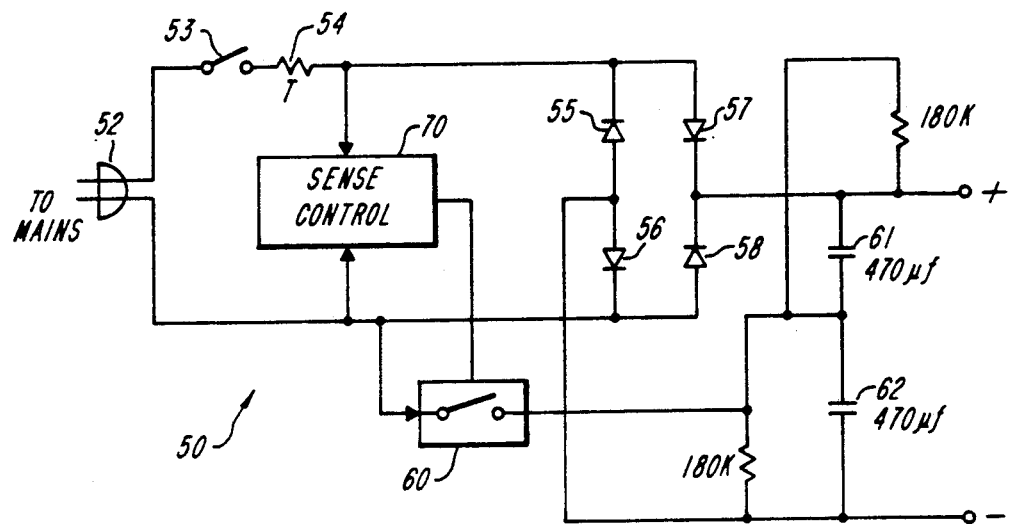
FIG. 1 is a block diagram of the power supply according to one embodiment of the present invention.

One embodiment of the dual mode power supply according to the present invention is shown in the block diagram 50 of FIG. 1, and is connected to the power mains at 52. The mains input is connected to a bridge rectifier including individual rectifiers 55, 56, 57 and 58 through a switch 53 and a thermistor 54 which limits the inrush current. The bridge rectifier provides pulsating D.C. output and is smoothed by a filter comprising two series connected capacitors, 61 and 62, wherein in the first mode, the output across the capacitors is a result of full wave rectification of the mains input voltage.

The present invention provides a second, voltage double mode of operation by connecting one side of the mains to the midpoint of the two series conneced capacitors 61 and 62 through a switch 60 which is selectively closed by a signal provided by a control circuit 70 in response to a signal derrived from the other side of the mains input. According to the present invention, the bridge rectifier and capacitors normally operate to conduct over a specified conduction time period, known as the conduction angle (60–120 degrees and from 240–300 degrees out of 360 degrees). The control circuit 70 determines the operation of the switch 60 in the time period immediately before each of the normal conduction periods. One manner of adjusting the conduction angle is by selection of a correspondingly large value of capacitors 61 and 62, such as 470 uF for each capacitor.

Figure 2:
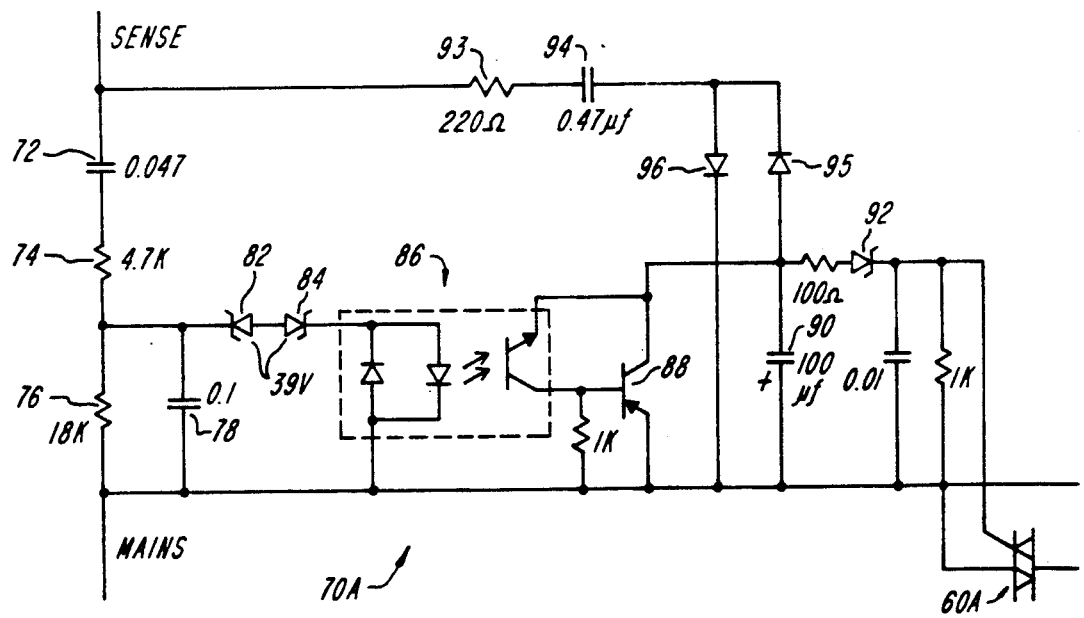
FIG. 2 is a schematic diagram of the control circuit and mode switch circuit according to the embodiment of FIG. 1.

Detailed schematic 70A of the control circuit 70 is shown in FIG. 2 and includes a TRIAC implementation 60A of the switch 60 of FIG. 1. According to the present invention, the determination of the appropriate mode of operation is determined immediately before the conduction of the rectifiers by providing a signal having a phase lead relative to the mains input. In the embodiment of FIG. 2, the phase lead is provided by a reactive voltage divider which, for values 0.047 uF and 0.1 uF and 4.7K and 18K ohms, respectively, provides an approximately 45 degree phase lead at 50 Hertz mains frequency. When the signal produced by the voltage divider at the junction of resistors 74 and 76 exceed a predetermined threshold, the switch 60A remains open, thus inhibiting voltage doubling operation of the power supply 50.

According to one embodiment of the present invention, a threshold is provided by series and oppositely connected 39 volt Zener diodes 82 and 84 which provide a conductive path for voltages in excess of 39 volts through bidirection optical isolator 86, which is responsive to the magnitude of the mains input of either polarity (A.C.), and causes current to flow through transistor 88 from capacitor 90. According to one embodiment of the present invention, the switch 60A is maintained in an open state (non-conductive) so long as the voltage across capacitor 90 is maintained below the predetermined threshold (39 volts). Thus, the conduction of transistor 88 in response to signals provided by the reactive voltage divider operates to reduce voltage across the capacitor 90 without reference to the smoothed D.C. output voltage or to any long term average.

According to one embodiment of the present invention, the TRIAC implementation 60A is responsive to a gate signal which is provided through Zener diode 92 from the potential developed across capacitor 90. The capacitor 90 is charged with a small current (10 ma.) through resistor 93, capacitor 94 and diode 95 in cooperation with diode 96. According to one feature of the present invention, the capacitor 94 alone or in combination with resistor 93 is selected to provide the small charging current 90 so as to require several cycles of mains input to charge capcitor 90 to a voltage level sufficient to exceed the Zener 92 potential (12 volts), which energizes TRIAC 60A to cause the power supply to operate in voltage doubler mode. Thus, the circuit according to the present invention initially inhibits the voltage doubler mode during a selected interval of the initial time period after switch 53 is closed, thus avoiding undesired voltage doubling when initially powered from an input mains in the upper voltage range.

Modifications and substitutions of the above exemplary implementation of the present invention made by one of ordinary skill in the art are within the scope of the present invention, which is not to be limited except by the claims which follow.

What is claimed is :

1. A dual mode power supply for selectively providing a rectified and a voltage doubled output voltage of a mains input voltage, comprising:

rectifier means for receiving said input voltage and providing a rectified D.C. output signal in response thereto;

filter means for receiving said rectified D.C. output, wherein said rectifier is operable over a selected conduction angle;

switch means for selectively connecting said input mains to said filter means to cause said rectifier to operate as a voltage doubler in response to a control signal; and control means connected to said mains input and connected to said switch means, including half-cycle means for providing an output signal in response to said mains input voltage during a single halfcycle period of said mains input voltage prior to the next conduction angle of said filter, threshold means providing a threshold signal for each half-cycle period of mains input voltage and providing an output signal when said half-cycle means output signal exceeds said threshold signal, and means for inhibiting said switch means prior to the beginning of said next conduction angle of said filter, in response to said threshold means output signal and enabling said switch means with said corresponding control signal provided in the absence of said threshold means output, wherein said control means is responsive to said mains input during the period prior to the beginning of said next conduction angle and subsequent to the prior said conduction angle.

2. A dual mode power supply for selectively providing a rectified and a voltage doubled output voltage of a mains input voltage, comprising:

rectifier means for receiving said input voltage and providing a rectified D.C. output signal in response thereto:

filter means for receiving said rectified D.C. output, wherein said rectifier is operable over a selected conduction angle;

switch means for selectively connecting said input mains to said filter means to cause said rectifier to operate as a voltage doubler in response to a control signal; and control means for providing said control signal and connected to said mains input and connected to said switch means, including means for inhibiting said switch means prior to the beginning of said conduction angle of said filter, in response to said mains input during the period to the beginning of said conduction angle and subsequent to the prior said conduction angle, wherein said control means includes a phase lead network and threshold means having a threshold level and wherein said phase lead network provides a signal in excess of said threshold level prior to the beginning of said conduction angle.

3. The dual mode power supply of claim 2, wherein said conduction angle is provided by selection of said filter and said rectifier.

4. The dual mode power supply of claim 2, wherein said control means includes a bidirectional optoisolator for providing operation of said control means for positive and negative mains signal polarity.

* * * * *